FIG. 1
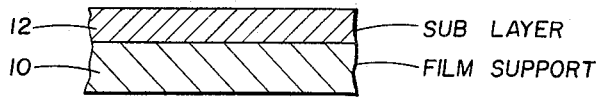
- 12 — SUB LAYER
- 10 — FILM SUPPORT

FIG. 2
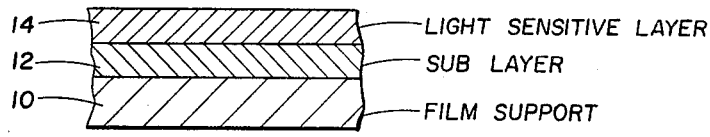
- 14 — LIGHT SENSITIVE LAYER
- 12 — SUB LAYER
- 10 — FILM SUPPORT

FIG. 3
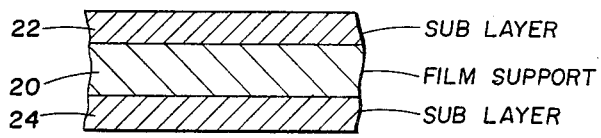
- 22 — SUB LAYER
- 20 — FILM SUPPORT
- 24 — SUB LAYER

FIG. 4
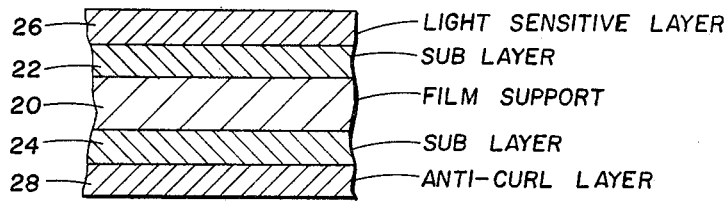
- 26 — LIGHT SENSITIVE LAYER
- 22 — SUB LAYER
- 20 — FILM SUPPORT
- 24 — SUB LAYER
- 28 — ANTI-CURL LAYER

FIG. 5
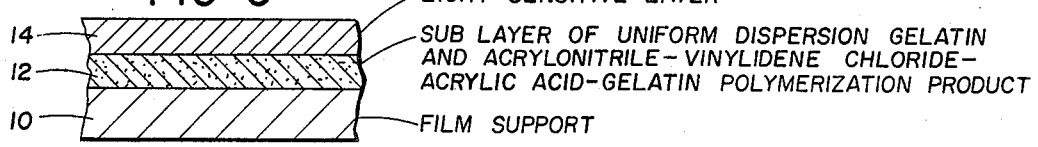
- 14 — LIGHT SENSITIVE LAYER
- 12 — SUB LAYER OF UNIFORM DISPERSION GELATIN AND ACRYLONITRILE-VINYLIDENE CHLORIDE-ACRYLIC ACID-GELATIN POLYMERIZATION PRODUCT
- 10 — FILM SUPPORT

FIG. 6
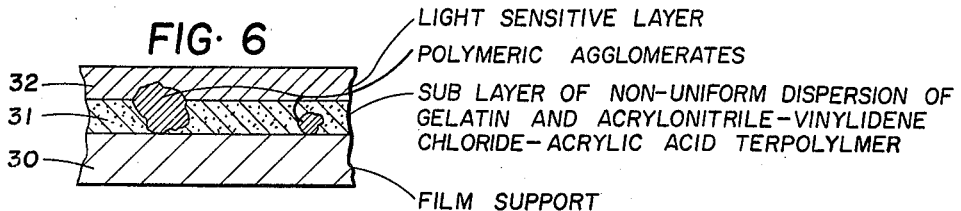
- 32 — LIGHT SENSITIVE LAYER / POLYMERIC AGGLOMERATES
- 31 — SUB LAYER OF NON-UNIFORM DISPERSION OF GELATIN AND ACRYLONITRILE-VINYLIDENE CHLORIDE-ACRYLIC ACID TERPOLYLMER
- 30 — FILM SUPPORT

United States Patent Office 3,501,301
Patented Mar. 17, 1970

3,501,301
COATING COMPOSITIONS FOR POLYESTER SHEETING AND POLYESTER SHEETING COATED THEREWITH
Gale F. Nadeau, Clemens B. Starck, and Frederick J. Jacoby, Rochester, N.Y., assignors to Eastman Kodak Company, Rochester, N.Y., a corporation of New Jersey
Continuation-in-part of application Ser. No. 495,018, Sept. 27, 1965, which is a continuation-in-part of application Ser. No. 320,597, Oct. 7, 1963, which in turn is a division of application Ser. No. 199,058, May 31, 1962. This application Nov. 29, 1966, Ser. No. 597,669
Int. Cl. G03c 1/80
U.S. Cl. 96—87                                      10 Claims

ABSTRACT OF THE DISCLOSURE

Hydrophilic photographic layers are anchored to polyester film supports by coating upon the film support compositions prepared by emulsion polymerization of several monomers in the presence of gelatin. The compositions further contain adhesion promoters, such as a phenol, and sufficient acid to make the compositions acidic. In a representative process, an aqueous acrylo-nitrile-vinylidene chloride-acrylic acid-gelatin polymerization product containing resorcinol is coated on a polyester film support and a gelatin-silver halide emulsion is coated directly thereon.

---

This application is a continuation-in-part of G. F. Nadeau et al., U.S. patent application Ser. No. 495,018, filed Sept. 27, 1965, now abandoned which is a continuation-in-part application of Gale F. Nadeau et al., U.S. patent application Ser. No. 320,597, filed Oct. 7, 1963, now abandoned, which in turn is a divisional application of Gale F. Nadeau et al., U.S. patent application Ser. No. 199,058, filed May 31, 1962, now abandoned.

The instant invention relates to a coating composition for polyester sheeting, to polyester sheeting coated therewith and to a method for preparing such sheeting. More particularly, this invention relates to a coating composition for polyester sheeting, to polyester sheeting having a coating on at least one surface thereof which functions as an improved anchoring substratum or subbing layer between the polyester sheet and a light-sensitive, water-permeable colloid layer or emulsion deposited thereon, preferably a gelatino silver halide emulsion layer, and to a method for preparing such sheeting.

Film base or support members prepared from polyester resins, such as high molecular weight linear polyesters derived by the condensation of terephthalic acid and diols, have proved highly satisfactory for use in the manufacture of photographic film products. Polyethylene terephthalate is a particularly suitable polyester resin for this purpose. Heretofore, in order to provide a photographic film product comprised of a polyester film support in which the light-sensitive emulsion layer firmly adheres to the film base, it has usually been necessary to first apply a plurality of intermediate anchoring layers on the polyester film support prior to the orientation and crystallization of the support.

It is substantially more difficult to adhere a subbing layer to an oriented film than to adhere such a layer to an unoriented film. Thus it is normally necessary to apply conventional subbing compositions prior to orientation of the support though it would obviously be more convenient to draw and tenter the polyester film directly after extrusion thereof. The dry bond between the inert, hydrophobic polyester film support and the hydrophilic emulsion must be secure not only during use in exposure apparatus, but also the wet bond must be secure during processing in various equipment and acid and alkaline liquid media. Under these conditions, it has been difficult merely to establish and maintain a satisfactory bond between the surface of the polyester film support and the first applied subbing layer even when a conventional subbing layer is applied prior to orientation.

An object of this invention is to provide a novel coating or subbing composition for application to at least one surface of a polyester film support which composition provides a firmly bonded subbing layer on such surface.

Another object of this invention is to provide a film element comprised of a polyester film support and a novel single subbing layer, the novel subbing layer being provided on at least one surface of the polyester film support and firmly bonded thereto.

A further object of this invention is to provide a photographic film product in which the light-sensitive emulsion layer firmly adheres to the film base.

A still further object of this invention is to produce a photographic film product employing as a film base therefor a high molecular weight polyester resin.

An additional object of this invention is to improve the surface properties of polyester film supports in such a manner that a coating or layer of a hydrophilic colloid layer can be applied thereto with an enhanced degree of adhesion between the polyester film support member and the hydrophilic colloid layer.

Yet another object of this invention is to provide a method of coating oriented polyester sheeting to render it receptive to adhesion by hydrophilic colloids.

Other objects of this invention will, in part, be obvious and will, in part, appear hereinafter.

For a complete understanding of the nature and the objects of this invention, reference is made to the following detailed description and drawing, in which:

FIG. 1 is a view in cross-section of a composite film element of this invention.

FIG. 2 is a view in cross-section of a photographic film product prepared in accordance with this invention.

FIG. 3 is a view in cross-section of a film element of this invention.

FIG. 4 is a view in cross-section of a film product of this invention.

FIG. 5 is a view in cross-section of a film product of the invention.

FIG. 6 is a view in cross-section of product similar to product of FIG. 5 containing undesirable terpolymer agglomerates avoided by this invention.

In accordance with this invention, there is provided a film element comprised of a polyester film support and a specific and novel subbing layer, which subbing layer will be detailed more fully hereinafter.

Further, and in accordance with this invention, there is provided a photographic film product comprised of (1) a polyester film support, (2) a specific and novel subbing layer and (3) at least one light-sensitive layer such as a silver halide emulsion layer. The novel subbing layer of this invention is highly adherent to the surface of the film support to which it is applied and provides highly satisfactory bonding characteristics for a subsequently applied light-sensitive emulsion layer. Also, the novel subbing layer can be applied to polyester supports by a unique method.

Suitable polyester sheet materials for use in carrying out this invention can be prepared from high-molecular weight polyesters derived by condensing a dihydric alcohol with a dibasic saturated fatty carboxylic acid or derivative thereof. Suitable dihydric alcohols include the glycols wherein the hydroxyl groups are on the terminal carbon atoms and contain from 2 to 12 carbon atoms. Specific examples of dihydric alcohols include ethylene glycol, propylene glycol, trimethylene glycol, hexamethylene glycol, decamethylene glycol, dodecamethylene glycol, 1,4-cyclohexane dimethanol, and the like. Examples of suitable dibasic acids include those containing from 2 to 16 carbon atoms such, for example, as adipic acid, sebacic acid, decanedioic acid, hexadecanedioic acid, phthalic acid, isophthalic acid, an terephthalic acid. The alkyl esters of the above acids can be employed satisfactorily also. Other suitable dihydric alcohols and dibasic acids that can be employed for preparing suitable polyesters from which sheet material can be prepared are described in U.S. Patent 2,720,503, dated Oct. 11, 1955.

The subbing or coating compositions of this invention are comprised of, by weight, (A) from about 5 to 40 parts of a specific aqueous resinous composition of about 5 to 30% by weight of solids, preferably about 20 to 30%, (B) from about 1 to 15 parts by weight of an adhesion promoter, and (C) acid preferably water-soluble organic acid such as malonic, salicylic and trifluoroacetic acids, and mixtures thereof, as required to adjust the pH to make the coating composition acidic, e.g. in a range of pH below about 6 and preferably about 2 to 4. The amount of acid added will depend in part upon the amount and type of adhesion promoter or other substance present which may itself be strongly acid as in the case of trichloroacetic acid, or may depend upon the amount and type of acidic or alkaline gelatin added to the subbing composition. The formation of a smooth homogenous subing layer of resinous material adhered firmly to the polyester film support, depends in part on the subbing composition containing (A) and (B) being acidic. The addition of inorganic acids to the composition for pH adjustment is less preferred primarily because of corrosion of the coating apparatus. It should be understood that while the acidic materials giving the coating composition containing (A) and (B) a pH less than about 6, must be present in the liquid coating composition, acids such as lower fatty acids can be expected to be volatilized during curing of the sub layer on the support depending in part upon their volatility, or conditions of curing the subbing layer. These acidic materials are not believed to be a critical part of the sub layer after it has dried down and has become adhered to the support. In fact, during the processing of the photographic film in strongly alkaline processing solutions these acidic materials are largely washed out of the sub layer and the adherence of the photographic emulsion layer to the support is not adversely affected. Although not absolutely necessary to provide a satisfactory coating composition, other addenda including from about 0.1 part to 1.5 parts by weight of gelatin, from about 0.05 to 0.2 part by weight of a non-anionic wetting or spreading agent, and/or from about 0.01 to 0.10 part by weight of a hardening agent for gelatin may advantageously be included in the composition.

Also, an anti-bacteria agent can be incorporated in the above composition if desired or required. If an anti-bacteria agent is employed, it may be employed in amounts of, for instance, from about 0.01 to 0.10 part by weight. Examples of suitable anti-bacteria agents include chlorinated biphenyl and p-chloro-m-xylenol (available commercially under the proprietary designation Ottasept).

Suitable non-anionic wetting or spreading agents include cetyl betaine, saponin and such well-known compositions as the alkyl aryl polyether alcohol types, the alkyl aryl polyethers and the alkyl polyether alcohols.

Hardening agents for gelatin are well known. Suitable hardening agents include chrome alum, chromic chloride, formaldehyde and the like. The function and operation of gelatin hardening agents are well known. Thus many operable hardeners will be apparent to those skilled in the art.

The adhesion promoter (B) is also an important and critical component of the subbing composition of this invention. Examples of suitable adhesion promoters include resorcinol, orcinol, catechol, pyrogallol, 2,4-dinitrophenol, 2,4,6-trinitrophenol, 4-chlororesorcinol, 2,4-dihydroxy toluene, 1,3-naphthalenediol, acrylic acid, the sodium salt of 1-naphthol-4-sulfonic acid, benzyl alcohol, trichloroacetic acid, o-hydroxybenzotrifluoride, m-hydroxybenzotrifluoride, o-fluorophenol, m-fluorophenol, p-fluorophenol, chloral hydrate, and o-cresol. Mixtures of two or more adhesion promoters can be employed if desired. Other workable adhesion promoters include ethylene carbonate, p-hydroxybenzotrifluoride, gallic acid, and 1-naphthol.

As in the case of the mentioned requirement that the coating composition containing (A) and (B) be acidic, the promoter (B) must also be present in the composition as the curing of the subbing layer on the support progresses. As in the case of the acidic component of the coating composition, a portion of substantially all of the promoter (B), such as resorcinol may volatilize during curing depending in part upon volatility, solubility in the support and conditions of curing of the subbing. It is not believed necessary that these promoters be present in the final cured sub layer after they have served their purpose in the coating and drying operation. In fact, during the processing of the photographic film in acid and alkaline photographic processing solutions the promoters remaining in the subbing layer may be expected to wash out and adherence of the photographic emulsion to the support is not adversely affected.

Accordingly, a fundamental product of our invention as claimed hereinafter includes the film support carrying a cured, firmly adhered subbing layer containing essentially only the resinous component of composition (A), there not necessarily being any of the promoter (B) or acid (C) present in the subbing layer since, as mentioned, (B) and (C) may have been volatilized.

Water is employed as the vehicle or carrier for the subbing composition of this invention and the amount of water employed is preferably sufficient to provide a batch subbing composition of about 100 parts by weight based upon the above necessary and/or optional constituents. However, the amount of water employed is not critical and can be widely varied with only minor adverse effect.

The aqueous resinous component of the subbing composition (A) is a stable latex continuing a polymerization product prepared by emulsion polymerization of a mixture comprised of (1) from about 5 to 45 percent by weight of a monomer selected from the group consisting of acrylonitrile, methacrylonitrile and alkyl acrylates wherein the alkyl group contains 1 to 6 carbon atoms, (2) from about 50 to 90 percent by weight of vinylidene chloride monomer, (3) from about 2 to 12 percent by weight of a monomer selected from the group consisting of acrylic acid, itaconic acid and monomethyl itaconate, a total of (1), (2) and (3) being 100 percent, and (4) from about 15 to 60 percent by weight of gelatin based upon the total weight of (1), (2) and (3).

It will be noted that the concentration of the hydrophilic material, i.e. the gelatin, is thus about 13 to 137.5 percent. Thus the latex is predominantly hydrophobic with regard to solids though the above expression of the composition, which is more convenient for most purposes, may be somewhat misleading concerning the amount of hydrophilic solids present.

The above-described composition concerns the generally operable range of the invention. It is to be understood that the change from a predominantly hydrophobic to a predominantly hydrophilic solids composition progresses by degree and the characteristics of the compositions also will change gradually rather than displacing a sharp change. However, the solids content of the latex must be predominantly hydrophobic.

Preferred compositions of the instant invention are obtained by polymerization of (1) from about 9 to 30 percent by weight of a monomer selected from the group consisting of acrylonitrile and methyl acrylate, (2) from about 50 to 90 percent by weight of vinylidene chloride monomer, (3) from about 2 to 12 percent by weight of acrylic acid, the total of (1), (2) and (3) being 100 percent, and (4) from about 20 to 30 percent by weight of gelatin based upon the total weight of (1), (2) and (3).

Polymerization is accomplished by charging the monomers and gelatin in an aqueous medium into a reaction chamber in the presence of a catalyst. The mixture is maintained at a temperature of preferably from 50° C. to 60° C. for a period of about 12 to 24 hours. It is preferable to stir the mixture during the period. Particularly suitable catalysts are the persulfates such as, for example, potassium persulfate, sodium persulfate, or ammonium persulfate. Persulfuric acid can also be employed if desired. Other catalysts such as those described in Illingsworth Patent No. 2,763,625 will be apparent to those skilled in the art. Amounts of catalyst varying from 0.25 to 1 percent by weight based upon the weight of monomers are generally operable.

Water is preferably used in amounts sufficient to provide a latex or dispersion after polymerization in which the solids content is from about 20 to 30 percent by weight of the aqueous dispersion. However, the amount of water is not critical.

It is of course desirable that the reaction be carried out in an inert atmosphere.

It is believed that the above polymerization product (A) comprises a polymeric material wherein the gelatin may be bonded directly to the polymer chains or has formed a stable complex with the polymer chains. In any event, the association of the gelatin with other polymer chains is such that it is not separable therefrom, e.g. by washing. The nature of the structure of the polymerization product is not otherwise known. This association of the gelatin with the polymer chains is distinct from a mechanical mixture of gelatin with a terpolymer resulting from co-polymerization of (1), (2) and (3) in absence of gelatin. The significance of this is that the coating composition of the invention containing polymerization product (A) promoter and (B) acidifier (C) is very stable and produces subbing layers of much higher quality i.e. smooth and homogeneous layers, than obtainable with the mechanical mixture of gelatin and terpolymer. This difference may be more clearly understood from consideration of Examples XVIIa and XVIIb below.

Oriented polyester film support provides sufficient adherence for coating of the subbing layer of the instant invention. The subbing layer is applied by conventional means such as doctor blade or air knife coating and then dried at a temperature of from about 150° F. to 275° F., although preferably at a temperature of about 250° F. Not only does the subbing layer adhere to the polyester support, but it also provides a surface which satisfactorily bonds to gelatin emulsions. Of course the subbing layer can be coated on unoriented polyester film support, but coating on oriented support is preferable for convenience.

The following examples are illustrative of methods for preparing the aqueous resinous compositions for use with this invention and of the process for using such compositions. The gelatin employed in the examples is an especially pure grade of pigskin gelatin commonly used in the photographic art.

EXAMPLE I

About 240 parts of distilled water, about 18 parts of gelatin, about 8.8 parts of methyl acrylate, about 50 parts of vinylidene chloride, about 12 parts of acrylic acid, and about 0.30 part of potassium persulfate are placed in a reaction vessel and the reaction vessel sealed. The reaction vessel is tumbled in a constant temperature bath maintained at a temperature of about 60° C. for a period of about 16 hours. The reaction vessel is tumbled at about 15 revolutions per minute. An excellent aqueous resinous composition is obtained which has a solids content of about 24 percent by weight.

EXAMPLE II

Into a jacketed, glass-lined reaction vessel provided with a thermostat and a motor-driven anchor-type agitator are placed 6 parts of potassium persulfate, about 4,800 parts of distilled water and about 360 parts of gelatin. The reaction vessel is then purged with nitrogen, after which about 176 parts of methyl acrylate, about 1,000 parts of vinylidene chloride and about 24 parts of acrylic acid are added to the reaction vessel and the vessel closed off. The resulting mixture is heated to a temperature of about 60° C. and this temperature is maintained substantially constant during the reaction period by setting the thermostat at 60° C. The mixture is agitated constantly during reaction by operating the agitator at 100 revolutions per minute. The reaction is allowed to proceed under these conditions for about 18 hours. The maximum temperature obtained during the reaction is about 61° C. A total of 6,240 parts of high-quality aqueous resinous composition is withdrawn from the reaction vessel and filtered through a filtering cloth. The aqueous resinous composition contains about 25 percent solids, by weight.

EXAMPLE III

An aqueous resinous composition is prepared in the same manner as that described in Example II with the exception that the amount of methyl acrylate employed is 162 parts, the amount of vinylidene chloride employed is 918 parts, and the amount of acrylic acid employed is 120 parts. About 6,270 parts of aqueous resinous composition is recovered from the reaction vessel and has a solids content of about 23 percent by weight. The aqueous resinous composition is substantially homogeneous throughout and remains substantially stable for prolonged periods of time.

EVAMPLE IV

About 6 parts of potassium persulfate, about 4,800 parts of distilled water, and about 300 parts of gelatin are placed in a jacketed, glass-lined reaction vessel provided with a motor-driven anchor-type agitator and a thermostat, and the reaction vessel is purged with nitrogen. Subsequently, about 173 parts of acrylonitrile, about 979 parts of vinylidene chloride, and about 48 parts of acrylic acid are added to the reaction vessel. The reaction vessel is then closed off and the mixture is heated to about 60° C. The thermostat is set at 60° C. and the agitator is operated at 100 revolutions per minute. The reaction is allowed to proceed for a period of time of about 18 hours during which time the temperature of the reaction mixture is maintained at about 60° C. and agitation is maintained. About 6,180 parts of high-quality homogeneous and stable aqueous resinous composition is withdrawn from the reaction vessel and filtered through a filter cloth. Prior to filtering, the composition is heated to about 40° C. owing to the fact that the aqueous resinous composition gels at room temperature. The aqueous resinous composition obtained in this example contains about 21.2 percent solids by weight.

EXAMPLE V

An aqueous resinous composition is prepared in substantially the same manner as that described in Example IV with the exception that 169 parts of acrylonitrile, 959 parts of vinylidene chloride and 72 parts of acrylic acid are employed. About 6,210 parts of aqueous resinous composition is recovered from the reaction vessel and has a solids content of about 22.7 percent by weight. This material gels at room temperature, but becomes a coatable fluid when heated to about 40° C.

EXAMPLE VI

An aqueous resinous composition is prepared in substantially the same manner as that described in Example IV with the exception that 166 grams of freshly distilled methacrylonitrile, 938 grams of vinylidene chloride and 96 grams of acrylic acid are used. A latex having about 22.4 percent solids content is produced. The latex is stable to freezing.

EXAMPLE VII

An aqueous resinous composition is prepared in substantially the same manner as that described in Example IV with the exception that 497 grams of freshly distilled methacrylonitrile, 607 grams of vinylidene chloride and 96 grams of acrylic acid are employed. The resulting latex displays properties similar to those of the latex of Example VI. The solids content is about 23 percent.

The following examples are illustrative of aqueous subbing compositions for use in this invention: wherein sufficient amounts of the dispersions of Examples I to VII are used so as to contain about 1 to 10 more grams solid polymerization product per 100 cc. of water. These subbing compositions are coated as described in Examples XVII etc. to obtain a thin subbing layer on the support containing about 10 to 40 grams solid polymerization product per 1000 sq. ft. of coating surface. The hydrophilic organic colloid vehicle such as gelatin added to these compositions can be varied, as will be seen below, depending in part upon the type and amount of the particular polymerization product used as well as its adherence to the film support and to the photographic emulsion layer coated thereon.

EXAMPLE VIII

| Component: | Parts by weight |
|---|---|
| Aqueous resinous composition of Example II | 10.0 |
| Gelatin | 0.5 |
| Resorcinol | 7.5 |
| Malonic acid | 0.2 |
| Cetyl betaine | 0.1 |
| Chrome alum | 0.018 |
| Water | Balance to 100 |

EXAMPLE IX

| Aqueous resinous composition of Example III | 10.0 |
|---|---|
| Gelatin | 0.4 |
| Resorcinol | 6.0 |
| Malonic acid | 0.5 |
| Cetyl betaine | 0.2 |
| Chrome alum | 0.1 |
| Water | Balance to 100 |

EXAMPLE X

| Aqueous resinous composition of Example III | 5.0 |
|---|---|
| Gelatin | 0.2 |
| Resorcinol | 2.0 |
| Salicylic acid | 0.4 |
| Saponin | 0.15 |
| Chrome alum | 0.1 |
| Water | Balance to 100 |

EXAMPLE XI

| Aqueous resinous composition of Example IV | 30.0 |
|---|---|
| Gelatin | 1.5 |
| Resorcinol | 15.0 |
| Malonic acid | 0.2 |
| Cetyl betaine | 0.2 |
| Chrome alum | 0.05 |
| Water | Balance to 100 |

EXAMPLE XII

| Component: | Parts by weight |
|---|---|
| Aqueous resinous composition of Example IV | 15.0 |
| Gelatin | 0.9 |
| Catechol | 6.5 |
| Trifluoroacetic acid | 0.4 |
| Saponin | 0.2 |
| Chrome alum | 0.06 |
| Water | Balance to 100 |

EXAMPLE XIII

| Aqueous resinous composition of Example V | 20.0 |
|---|---|
| Gelatin | 0.7 |
| Resorcinnol | 5.5 |
| Salicylic acid | 0.5 |
| Cetyl betaine | 0.1 |
| Chrome alum | 0.1 |
| Water | Balance to 100 |

EXAMPLE XIV

| Aqueous resinous composition of Example V | 15.0 |
|---|---|
| Gelatin | 0.75 |
| Resorcinol | 15.0 |
| Malonic acid | 0.3 |
| Cetyl betaine | 0.15 |
| Chrome alum | 0.03 |
| Water | Balance to 100 |

EXAMPLE XV

| Aqueous resinous composition of Example VI | 20.0 |
|---|---|
| Gelatin | 0.7 |
| Resorcinol | 10.0 |
| Salicylic acid | 0.4 |
| Water | Balance to 100 |

EXAMPLE XVI

| Aqueous resinous composition of Example VII | 10.0 |
|---|---|
| Resorcinol | 15.0 |
| Malonic acid | 0.4 |
| Water | Balance to 100 |

EXAMPLE XVII

A fully oriented polyethylene terephthalate film support is coated with the aqueous subbing composition of Example VIII and subsequently dried at a temperature of 250° F. whereby there is provided a composite film element comprised of the polyethylene terephthalate film support and the novel subbing layer of this invention. A light-sensitive gelatin silver bromide emulsion layer is subsequently applied on the subbing layer and dried. The resulting photographic film product is comprised of a polyethylene terephthalate film support, a single sub layer and a light-sensitive layer. The film product shows excellent adhesion of the light-sensitive layer to the film base before, during and after processing.

During the process of forming the subbing layer or stratum on the polyester support as illustrated in the above example, it is believed that the adhesion promoter such as resorcinol initially causes the formation at the surface of the film support, of a stratum of a mixture of the adhesion promoter, the polymerization product, and gelatin. As the drying of the stratum progresses, the water and a portion or substantially all of the adhesion promoter or of the organic acid, or both, may volatilize from the stratum leaving a smooth homogeneous predominately hydrophobic stratum of the polymerization product adhering to the support and to which the subsequently applied light-sensitive layer will firmly adhere. As mentioned above, the extent of volatilization of materials from the subbed film will depend somewhat upon their volatility, and their solubility in the subbing layer as well as the conditions of curing the subbing layer. Slow, low temperature curing of the layer results in retention of larger amounts of the adhesion promoter and organic acid in the layer but this has no deleterious effect.

EXAMPLE XVIIa

The process of Example XVII is carried out except substituting the acrylonitrile-vinylidene chloride-acrylic acid-gelatin polymerization product subbing composition of Example XI for that of Example VIII. As shown in FIG. 5, the curing of the sub layer on the support results in the formation on support 10 of the smooth sub layer 12 of a homogeneous dispersion in gelatin of the acrylonitrile-vinylidene chloride-acrylic acid-gelatin polymerization product. Under the electron microscope the layer is seen to be composed of closely grouped spherical particles or bodies, of polymerization product surrounded by a matrix of presumably gelatin. The significance of this will be seen from consideration of the following Example XVIIb.

EXAMPLE XVIIb

The process of Example XVIIa was carried out except that the aqueous subbing composition of Example XI was replaced with the following:

| | Parts by weight |
|---|---|
| Aqueous (20%) dispersion terpolymer 14.5 acrylonitrile-81.5 vinylidene chloride-4.0 acrylic acid (U.S. 3,143,421) | 30.0 |
| Gelatin | 3.0 |
| Resorcinol | 15.0 |
| Malonic acid | 0.2 |
| Cetyl betaine | 0.2 |
| Chrome alum | 0.05 |
| Water | Balance to 100 |

The composition differs critically from that used in Example XXVIIa in that the terpolymer was not formed by polymerization in the presence of gelatin. Gelatin, 3.0 parts, was only added when compounding the coating composition not during polymerization. As a result, it is found that either at the time the gelatin, resorcinol, terpolymer and other components are being mixed, or during the coating and drying of the composition on the polyester support, large polymeric agglomerates visible to the eye are formed in the sub layer with the result that a heterogeneous layer is obtained. FIG. 6 shows the appearance of these agglomerates in the heterogeneous sublayer 31. As a result, the subsequently applied emulsion layer 32 is not uniform and photographic images obtained therein do not possess the desired photographic quality.

As mentioned previously, the difference in quality of product seen by viewing FIG. 5 and FIG. 6 is believed to be due to the fact that the polymerization product of components (1), (2), (3) and (4) result in a strong bond of the gelatin (4) to the polymer chains containing the monomeric units (1), (2) and (3). This results in a stable coating latex from which uniform homogeneous subbing layers are obtained. The mechanical addition of gelatin to the terpolymer Example XVIIb, containing the same monomeric units (1), (2) and (3) while useful for some purposes does not yield compositions and subbing layers of the stability and uniformity characterized by the present invention.

EXAMPLE XVIII

A photographic film product is prepared in substantially the same manner as Example XVII with the exception that the aqueous subbing composition employed is that of Example IX. The resulting photographic film product is comprised of a lightsensitive layer, a single sub layer, and a polyethylene terephthalate film support. The subbing layer adheres extremely well to the polyester film support and the light-sensitive layer is highly adherent to the subbing layer. The highly satisfactory bonding properties of the photographic film product remain substantially the same during and after processing.

EXAMPLE XX

A photographic film product is prepared in the manner described in Example XIX with the exception that the aqueous subbing composition of Example XI is employed. The resulting photographic product is highly satisfactory and the individual layers thereof show no separation before, during or after processing of the film product.

EXAMPLE XXI

A photographic film product is prepared in the manner described in Example XIX with the exception that the subbing composition of Example XII is employed. A highly satisfactory photographic film product is prepared having substantially the same properties as that of Example XIX.

EXAMPLE XXII

A photographic film product is prepared in substantially the same manner as that described in Example XIX with the exception that the aqueous subbing composition of Example XIII is employed. A highly satisfactory film product is produced.

EXAMPLE XXIII

A photographic film product is prepared in the same manner as that described in Example XIX with the exception that the aqueous subbing composition of Example XIV is employed. A highly satisfactory film product is produced.

EXAMPLE XXIV

A photographic film product is prepared in the same manner as described in Example XIX with the exception that the aqueous subbing composition of Example XV is employed. A highly satisfactory film product is produced.

EXAMPLE XXV

A photographic film product is prepared in the same manner as described in Example XIX with the exception that the aqueous subbing composition of Example XVI is used. The resulting photographic product is highly satisfactory and the individual layers thereof show no separation as a result of processing of the film product.

Referring to the drawing, FIG. 1 shows a film element prepared in accordance with this invention which is comprised of a polyester film support 10 and the novel sub layer 12 of this invention. FIG. 2 shows a photographic film product of this invention which is comprised of the film element of FIG. 1 carrying thereon a light-sensitive layer 14.

While the above specific examples show the application of the novel sub layer of this invention to one surface of a polyester film support, it is to be understood that the other surface can be coated with the sub layer of this invention also. This aspect of the invention is shown in FIG. 3 of the drawing wherein there is shown a film element comprised of a polyester support 20, a sub layer 22 on one surface thereof and a sub layer 24 on the other surface thereof.

To the sub layer 22 of FIG. 3 there can be applied an ordinary gelatino-silver halide emulsion layer. To eliminate any tendency to curl, the sub layer 24 can be overcoated with a gelatin composition containing no silver halide, but which can contain, if desired, antistatic agents, filter dyes, antihalation agents, and the like. This aspect is shown in FIG. 4 of the drawing wherein there is shown a photographic film product comprised of the film element of FIG. 3 and having thereon a light-sensitive layer 26 and an anti-curl layer 28.

It will be apparent to those skilled in the art, after considering the above description of this invention and the examples, that a highly satisfactory film product is prepared employing as the film support member thereof a polyester film support and particularly a film support prepared from polyethylene terephthalate. It will also be apparent that, by employing the subbing composition disclosed and described in this invention, only one subbing layer need be applied to a surface of a polyethylene terephthalate film support member to provide for satisfactory adhesion thereto of the light-sensitive emulsion layer.

While the coated polyester sheet of this invention is particularly useful in the preparation of photographic film products, it is to be understood that it can be used for other purposes such for example as wrapping and packaging materials.

The invention has been described in detail with particular reference to preferred embodiments thereof, but it will be understood that variations and modifications can be effected within the spirit and scope of the invention as described hereinabove and as defined in the appended claims.

What we claim is:

1. As an article of manufacture a polyester film support having on at least one surface thereof a thin subbing layer resulting from coating and drying on the support a composition comprised of, by weight,
    (A) from 5 to 40 parts of an aqueous resinous composition prepared by emulsion polymerization of a mixture comprised of
        (1) from about 5 to 45 percent by weight of a monomer selected from the group consisting of acrylonitrile, methacrylonitrile and alkyl acrylates wherein the alkyl group contains 1 to 6 carbon atoms,
        (2) from about 50 to 90 percent by weight of vinylidene chloride monomer,
        (3) from about 2 to 12 percent by weight of a monomer selected from the group consisting of acrylic acid, itaconic acid and monomethyl itaconate, the total of (1), (2) and (3) being 100 percent, and
        (4) from about 15 to 60 percent by weight of gelatin based upon the total weight of (1), (2) and (3),
    (B) from about 1 to 15 parts of an adhesion promoter selected from the group consisting of resorcinol, orcinol, catechol, pyrogallol, 2,4-dinitrophenol, 2,4,6-trinitrophenol, 4-chlororesorcinol, 2,4-dihydroxy toluene, 1,3-naphthalenediol, acrylic acid, the sodium salt of 1-naphthol-4-sulfonic acid, benzyl alcohol, trichloroacetic acid, o-hydroxybenzotrifluoride, m-hydroxybenzotrifluoride, o-fluorophenol m-fluorophenol, p-fluorophenol, chloral hydrate, o-cresol, ethylene carbonate, p-hydroxybenzotrifluoride, gallic acid, 1-naphthol and mixtures thereof, and
    (C) sufficient water-soluble organic acid to make the composition acidic.

2. The article of claim 1 wherein the adhesion promoter is resorcinol.

3. The article of claim 2 wherein the polyester film support is polyethylene terephthalate.

4. The article of claim 3 wherein a light-sensitive photographic layer is adhered directly to the thin subbing layer.

5. The article of claim 1 wherein a portion of the adhesion promoter and water soluble organic acid has volitalized from the subbing layer during drying.

6. The article of claim 5 wherein the organic acid used is malonic acid, salicylic acid or trifluoroacetic acid.

7. The article of claim 1 wherein the adhesion promoter is resorcinol and a portion of the resorcinol and water soluble organic acid has volitalized from the subbing layer during drying.

8. A coating composition comprised of, by weight,
    (A) from 5 to 40 parts of an aqueous resinous composition prepared by emulsion polymerization of a mixture comprised of
        (1) from about 5 to 45 percent by weight of a monomer selected from the group consisting of acrylonitrile, methacrylonitrile and alkyl acrylates wherein the alkyl group contains 1 to 6 carbon atoms,
        (2) from about 50 to 90 percent by weight of vinylidene chloride monomer,
        (3) from about 2 to 12 percent by weight of a monomer selected from the group consisting of acrylic acid, itaconic acid and monomethyl itaconate, the total of (1), (2), and (3) being 100 percent, and
        (4) from about 15 to 60 percent by weight of gelatin based upon the total weight of (1), (2) and (3),
    (B) from about 1 to 15 parts of adhesion promoter selected from the group consisting of resorcinol, orcinol, catechol, pyrogallol, 2,4 - dinitrophenol, 2,4,6 - trinitrophenol, 4 - chlororesorcinol, 2,4 - dihydroxy toluene, 1,3 - naphthalenediol, acrylic acid, the sodium salt of 1 - naphthol - 4 - sulfonic acid, benzyl alcohol, trichloroacetic acid, o - hydroxybenzotrifluoride, m - hydroxybenzotrifluoride, o - fluorophenol, m - fluorophenol, p - fluorophenol, chloral hydrate, o - cresol, ethylene carbonate, p - hydroxybenzotrifluoride, gallic acid, 1 - naphthol and mixtures thereof, and
    C) sufficient water-soluble organic acid to make the composition acidic.

9. The coating composition of claim 8 wherein the adhesion promoter is resorcinol.

10. A coating composition comprised of, by weight,
    (A) from 5 to 40 parts of an aqueous resinous composition prepared by emulsion polymerization of a mixture comprised of
        (1) from about 5 to 45 percent by weight of a monomer selected from the group consisting of acrylonitrile, methacrylonitrile and alkyl acrylates wherein the alkyl group contains 1 to 6 carbon atoms,
        (2) from about 50 to 90 percent by weight of vinylidene chloride monomer,
        (3) from about 2 to 12 percent by weight of a monomer selected from the group consisting of acrylic acid, itaconic acid and monomethyl itaconate, the total of (1), (2), and (3) being 100 percent, and
        (4) from about 15 to 60 percent by weight of gelatin based upon the total weight of (1), (2) and (3),
    (B) from about 1 to 15 parts of adhesion promoter selected from the group consisting of resorcinol, orcinol, catechol, pyrogallol, 2,4 - dinitrophenol, 2,4,6 - trinitrophenol, 4 - chlororesorcinol, 2,4 - dihydroxy toluene, 1,3 - naphthalenediol, acrylic acid, the sodium salt of 1 - naphthol - 4 - sulfonic acid, benzyl alcohol, trichloroacetic acid, o - hydroxybenzotrifluoride, m - hydroxybenzotrifluoride, o - fluorophenol, m - fluorophenol, p - fluorophenol, chloral hydrate, o - cresol, ethylene carbonate, p - hydroxybenzotrifluoride, gallic acid, 1 - naphthol and mixtures thereof, and
    (C) sufficient water-soluble organic acid selected from the group consisting of malonic acid, salicylic acid, trifluoroacetic acid and mixtures thereof rendering the composition acidic,
    (D) from about 0.1 to 1.5 parts of gelatin,
    (E) from about 0.05 to 0.2 part of a non-anionic wetting agent, and
    (F) from about 0.01 to 0.010 part of a gelatin hardening agent.

(References on following page)

References Cited

UNITED STATES PATENTS

| | | | |
|---|---|---|---|
| 2,341,877 | 2/1944 | Middleton et al. | 96—87 |
| 2,776,219 | 1/1957 | Hoyt et al. | 106—128 |
| 2,853,457 | 9/1958 | Gates et al. | 117—155 X |
| 2,893,896 | 7/1959 | Beeber et al. | 117—138.8 X |
| 2,943,937 | 7/1960 | Nadeau et al. | 117—161 X |
| 2,976,168 | 3/1961 | Thompson et al. | 117—34 |
| 3,021,229 | 2/1962 | Morgan | 117—161 X |
| 3,062,674 | 11/1962 | Houck et al. | 117—34 |
| 3,072,483 | 1/1963 | Trevoy et al. | 117—161 X |
| 3,143,421 | 8/1964 | Nadeau et al. | 96—87 |

RONALD H. SMITH, Primary Examiner

U.S. Cl. X.R.

117—34, 138.8, 161; 260—8, 29.6

PO-1050
(5/69)

UNITED STATES PATENT OFFICE
CERTIFICATE OF CORRECTION

Patent No. 3,501,301         Dated March 17, 1970

Inventor(s) Gale F. Nadeau, Clemens B. Starck, & Frederick J. Jacoby

It is certified that error appears in the above-identified patent and that said Letters Patent are hereby corrected as shown below:

Column 12, Line 72:

"0.010" should read ---0.10---.

SIGNED AND
SEALED

SEP 29 1970

(SEAL)
Attest:

Edward M. Fletcher, Jr.
Attesting Officer

WILLIAM E. SCHUYLER, JR.
Commissioner of Patents